United States Patent [19]

Wardle

[11] 4,432,080
[45] Feb. 14, 1984

[54] SUBWAVELENGTH MONOPOLE UNDERWATER SOUND RADIATOR

[75] Inventor: William F. Wardle, Mystic, Conn.

[73] Assignee: The United States of America as represented by the Secretary of the Navy, Washington, D.C.

[21] Appl. No.: 307,557

[22] Filed: Oct. 1, 1981

[51] Int. Cl.³ .......................................... H04R 17/00
[52] U.S. Cl. .................................. 367/163; 367/166; 367/171; 310/337; 310/26
[58] Field of Search ............... 367/141, 153, 155, 156, 367/157, 165, 166, 167, 171, 172, 173, 174, 175; 179/110 A, 110 C, 110 D, 110 E; 310/26, 337

[56] References Cited

U.S. PATENT DOCUMENTS

| | | | |
|---|---|---|---|
| 2,832,843 | 4/1958 | Miessnei | 367/175 X |
| 2,967,956 | 1/1961 | Dranetz et al. | 310/9.1 |
| 2,978,672 | 4/1961 | Barney | 340/14 |
| 3,127,527 | 3/1964 | Elston et al. | 367/165 X |
| 3,274,537 | 9/1966 | Toulis | 367/163 X |
| 3,277,433 | 10/1966 | Toulis | 340/8 |
| 3,327,285 | 6/1967 | O'Connor et al. | 367/141 X |
| 3,449,712 | 6/1969 | Angeloff | 340/8 |
| 3,462,730 | 8/1969 | Angeloff | 340/8 |
| 3,500,304 | 3/1970 | Bozich | 340/9 |
| 3,734,233 | 5/1973 | Wiley | 181/5 AG |
| 4,178,577 | 12/1979 | Cini et al. | 367/159 |

Primary Examiner—Harold I. Tudor
Assistant Examiner—Tyrone Davis
Attorney, Agent, or Firm—Robert F. Beers; Arthur A. McGill; Prithvi C. Lall

[57] ABSTRACT

A compact subwavelength size monopole underwater sound radiator has characteristics to maximize resistive radiation impedance, minimize reactive radiation impedance, facilitate heat dissipation and minimize compensating air usage. This results in improved efficiency, bandwidth and use factor. The underwater sound radiator uses two back-to-back mounted, frustum shaped, hollow, radiating shells to achieve radiation characteristics approximating those of an equivalent sized pulsating sphere. An elliptically shaped, uniform cross-section magnetostrictive ring crossed by a linear piezoelectric spreader comprises a compact eclectic driver. Both the magnetostrictive ring and the piezoelectric stack contribute to the output through inverse phase cyclic changes in their respective lengths those changes being added and amplified by the flexural-bow type action of the elliptically shaped magnetostrictive ring. Air maintained at the pressure of the surrounding water fills an elastomer walled tube which is routed in close proximity to appropriate interior radiator surfaces. This provides a compressibility function with an oil-filled radiator. The oil transfers heat from the driver to the water cooled radiator structures.

12 Claims, 2 Drawing Figures

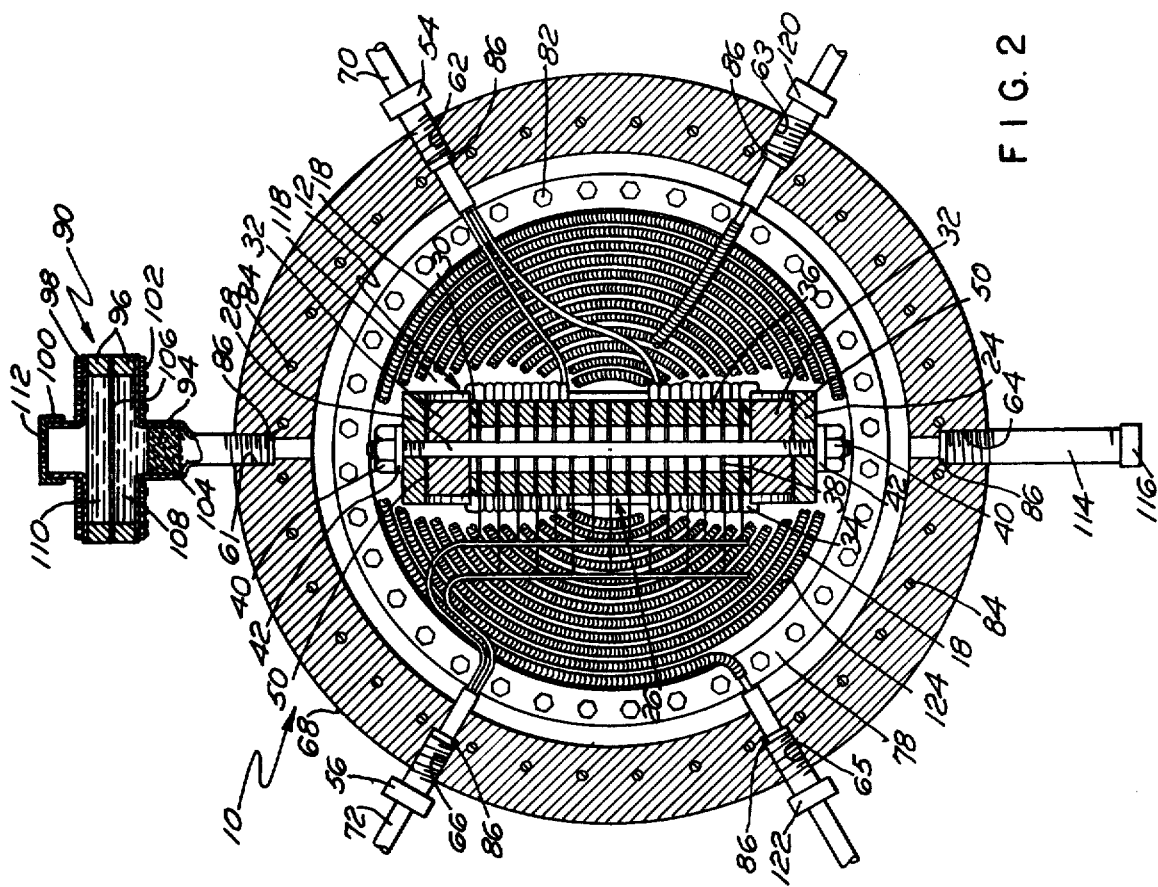
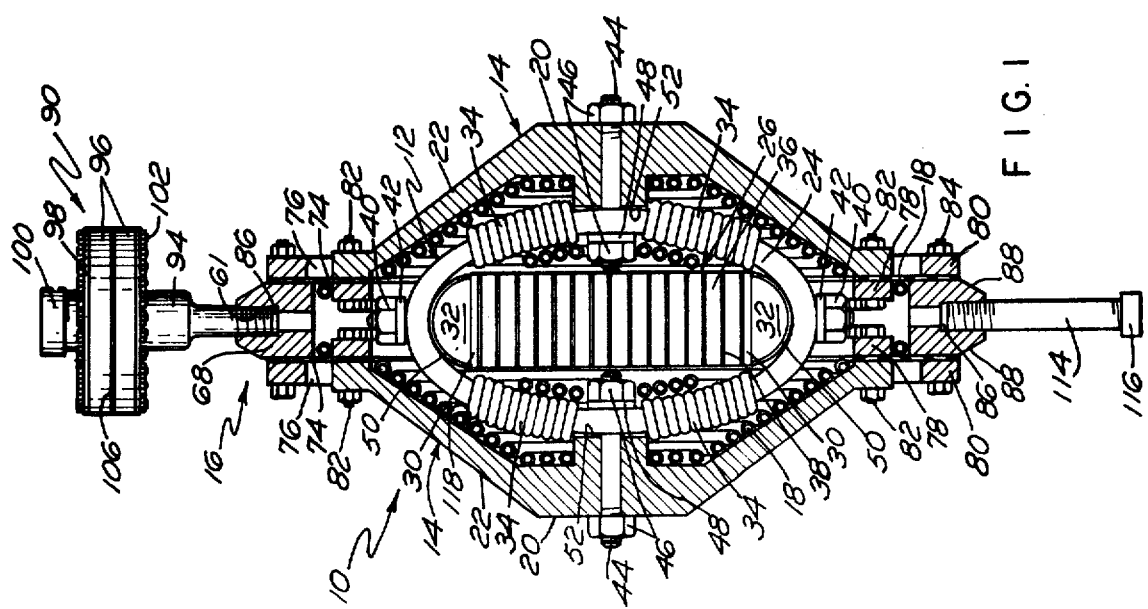

SUBWAVELENGTH MONOPOLE UNDERWATER SOUND RADIATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention pertains to subwavelength size, monopole, underwater sound radiators. The term subwavelength infers that overall radiator dimensions are a small fraction of one wavelength, the term monopole characterizing a radiation mode where the radiator's aggregate volume cyclically varies. A mechanism termed a driver cylically moves a radiating face or faces which are in contact with the medium to accomplish this volume change. Radiating face motion is facilitated by placing a compressible volume such as air, maintained at the same pressure as the surrounding medium, adjacent to interior radiating face surfaces and establishing pliant or jointed radiating face peripheral regions. The radiation impedance of isolated subwavelength size radiators is too reactive for the efficient radiation of sound. When radiation efficiency is important, subwavelength size radiators can be coupled to the medium with impedance matching horns, by assembly into closely packed arrays, and other techniques.

(2) Description of the Prior Art

It is usually desirable that individual subwavelength size radiators achieve as high a resistive and as low a reactive radiation impedance as possible. Pulsating spherical radiators are optimum for this purpose because they initiate spherical wavefronts at their radiating faces. However, they are difficult to achieve in a practical design. Gas-filled elastomeric spheres are probably the closes approach but their operating parameters are constrained by the resonance and other properties of the contained gas effectively interposing a depth dependent spring function between driver and radiating face. That spring function depending on its softness reduces bandwidth. Common radiating face shapes such as flat, hemispherical, and conical initiate substantially non-spherical wavefronts that evolve into spherical wavefronts by a nearfield diffractive process. The transposing of pressures and velocities in this process further contributes to the relatively high reactive radiation impedances and low efficiencies of many subwavelength sized radiators.

It is often desirable to amplify driver displacement to obtain a better match between driver and radiation impedance. This can be achieved by mechanical motion amplifiers, by large radiating faces, or combinations of both. Unfortunately, both methods involve introducing more structure into the oscillating process with associated problems of stiffness and weight. Weight adds to the reactive load to and from which energy must be transferred. Springs or equivalents are sometimes introduced in parallel with a driver to help control the reactive load but this increases mechanical Q and narrows bandwidth. Stiffness is equally important to a radiating face since it helps keep all sections of a face in phase. Conically shaped radiating faces can help solve these problems since they are inherently both stiff and light. They cyclically transpose the axial stresses imparted by the driver, that would have become bending stresses in a flat radiating plate, into circumferentially aligned tensional and compressional stresses. Unfortunately, as noted earlier, conical radiators do not approximate a pulsating sphere.

Other problems involve cooling applicable parts and supplying compressed air. The two problems can be related. The portion of the radiator interior not occupied by the driver is often filled with air the result being more air than is needed for the compressible volume function, air a part of which must be transferred with each change in depth. This air often serves to thermally and electrically insulate the driver. The electrical insulating function is desirable but can be replaced by various coatings and submergence in oil. The thermal insulating function is undesirable since it can both limit the strength of length of acoustic transmissions and subject the radiator to possible thermal damage.

SUMMARY OF THE INVENTION

Optimum results are accomplished by configuring an acoustic radiator with two identical radiating faces in the form of hollow frustum-shaped shells. The pair of shells combine acoustic radiation characteristics which are a very rough approximation of a pulsating sphere with a relatively stiff lightweight structure. The large open ends of the shells face each other being connected by an intervening median ring assembly. The median ring assembly incorporates diaphragms which permit the shells to move a very short distance toward and away from each other. The small closed ends of the shells are rigidly fastened to each end of a driver which is positioned in the center of the chamber formed by the assembled shells and median ring assembly. The driver consists of an elliptically shaped magnetostrictive ring and piezoelectric spreader having inherent spring and motion amplification functions. By cyclically varying its dimensions in response to an electric power signal, the driver imparts an oscillatory motion to the shells, the shells being able to move because of the aforementioned diaphragms and the presence of a compressible volume consisting of an air-filled elastomeric tube routed past appropriate locations within the oil-filled radiator interior. The oil serves to transfer heat from the driver to the environment through its contact with cool radiator parts.

BRIEF DESCRIPTION OF THE DRAWINGS

FIG. 1 is a mid-plane side orthographic sectional view of an underwater acoustic radiator;

FIG. 2 is a mid-plane front orthographic sectional view of an underwater acoustic radiator.

DESCRIPTION OF THE PREFERRED EMBODIMENT

Figure 3:
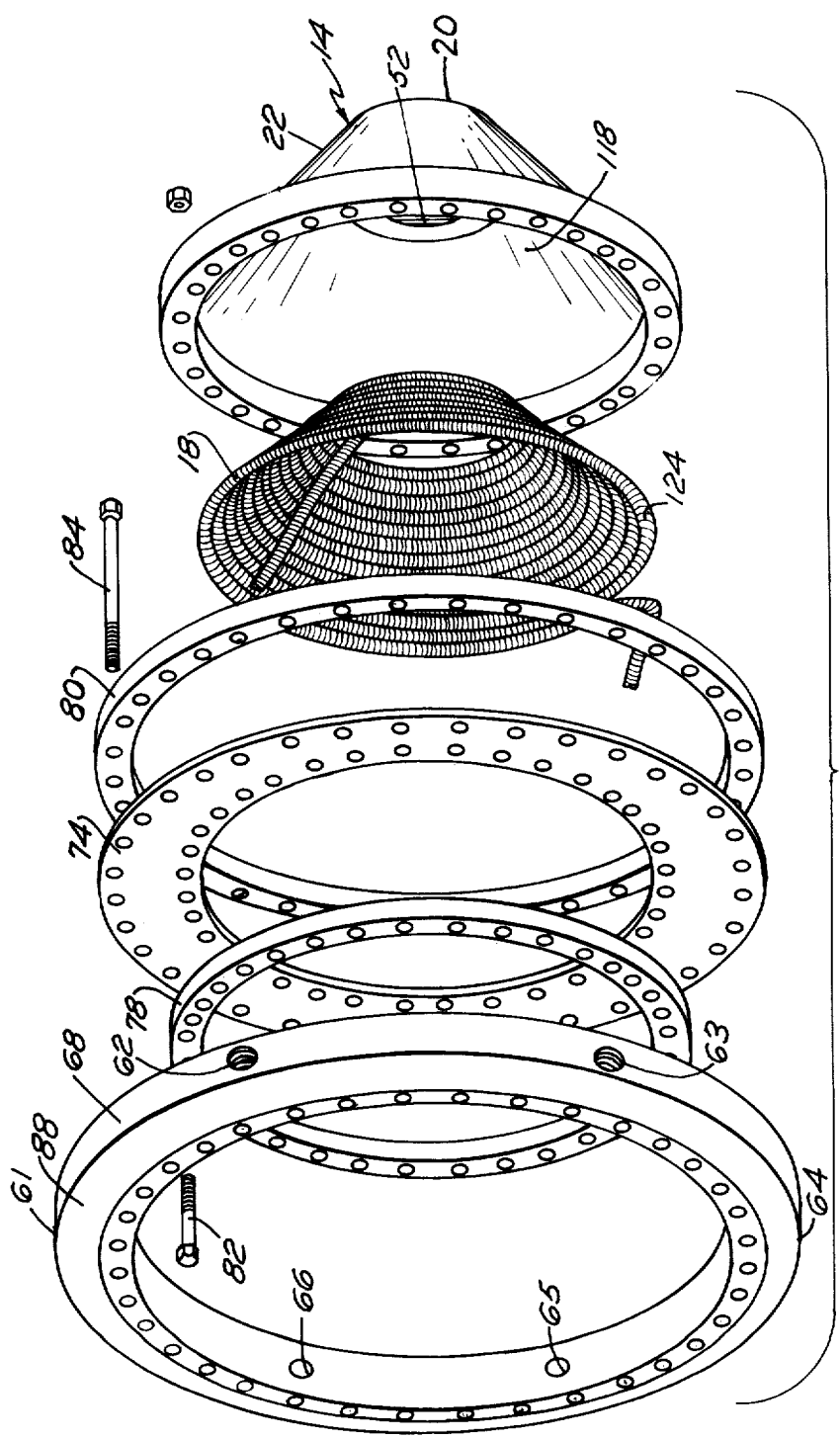
FIG. 3 is an exploded pictorial showing an oblique view of major radiator components from the radiating shell inward to the median ring on the right half of FIG. 1.

Referring to the drawings there is shown in FIGS. 1 and 2 side and front orthographic sectional views of a subwavelength size, monopole, underwater sound radiator 10. In order to better discern the form and function of some of the principal parts, exploded pictorials of a portion of radiator 10 are shown in FIG. 3. Part and location numbers are the same in FIGS. 1–3 and it is intended that FIGS. 1-3 be referred to concurrently throughout the following explanation.

The principal components of radiator 10 comprise frustum-shaped radiating shells 14, a median ring assembly 16, the driver 12, and a flexible elastomeric air-filled tube 18.

Each radiating shell 14 can be divided into two radiating regions: truncated ends 20, and conical sides 22. The shells 14 are fabricated of aluminum alloy or similar non-magnetic material exhibiting a combination of strength, low density, stiffness, and fatigue resistance. Their conical axes coincide and they approach and separate from each other in unison during every cycle. Tapered wall thickness tends to even stress throughout the shells 14. Materials and dimensions are selected to keep the relative distortion of radiating faces 20 and 22 to a fraction of the motion imparted by the driver 12.

The desire to achieve a radiation impedance as close as possible to that of an equivalent sized pulsating sphere is accomplished by minimizing the difference between radiating face sections 20 and 22 and an equivalent spherical surface and distributing the actual acoustic displacements as evenly as possible over that same equivalent spherical surface. That is, their combined surfaces do not diverge grossly from a spherical shape and their combined radiation tends to uniformly cover all solid angles.

Motion imparted to the truncated center of a radiating shell 14 by the driver 12 travels to the shell periphery at a speed which is not many times faster than the speed of sound in water. This necessitates placing the shells periphery further from the radiator center than if all portions of shells 14 were assumed to radiate in phase.

The driver 12 is comprised of an elliptical magnetostrictive ring 24, a piezoelectric stack 26 functioning as a spreader, a stress rod 28, insulating shims 30, and half cylinder adaptors 32. The magnetostrictive ring 24 is laminated of thin strips of pure nickel or alloys such as nickel-cobalt or iron-aluminum. Optionally, it may have rounded corners to permit fitting within available space. It is energized by electric coils 34 of insulated copper or other conductor. The piezoelectric stack 26 consists of axially polarized layers 36 of barium titanate or other piezoelectric material separated by layers 38 of conducting foil such as aluminum foil. The stress rod 28 shown in U.S. Pat. No. 2,930,912 passes through the hollow center of piezoelectric stack 26 and apertures in magnetostrictive ring 24 and adaptors 32. The stress rod 28 is constructed of brass or other non-magnetic material and serves when nuts 40 and associated washers 42 are tightened as a tensioned spring to hold the magnetostrictive ring 24 and piezoelectric stack 26 in positive contact and to maintain a compressive stress in the piezoelectric stack 26. The adaptors 32 are fabricated of a low-density, non-magnetic, high modulus material such as aluminum. Insulating shims 30 must be as incompressible as possible and can be fabricated from thin sheets of high modulus plastic. The driver 12 is fastened to the radiating shells by threaded rods 44, nuts 46, and washers 48. The design details including design stresses in the magnetostrictive ring 24, piezoelectric stack 26 and stress rod 28 will follow accepted practice.

The driver 12 is similar to the flexural-extensional transducer shown in U.S. Pat. Nos. 3,274,537 and 3,277,433 with an elliptical magnetostrictive ring 24 replacing the non-active bows. An additional difference is that the magnetostrictive ring 24 has a small contact area with adaptor 32 which increases its spring compliance and lowers the associated resonant frequency. A further difference involves corrugated surface 50 of adaptors 32 and corrugated surface 52 of shells 14 which vent the dynamic pressures developed at the two wedge-shaped junctions. Washers 42 and 48 may be similarly vented. Alternately the interior and exterior surfaces of the magnetostrictive ring 24 may be circumferentially corrugated to provide the venting function.

The magnetostrictive ring 24 and piezoelectric stack 26 are individually connected through fittings 54 and 56 positioned in threaded holes 62 and 66 in median ring 68 via suitable electric cables 70 and 72 and impedance matching devices such as transformers, not shown, to a signal source, also not shown, in such a way that when one is expanding the other is contracting. This mix of inductive and capacitive loads improves the power factor. The bow-like configuration of the magnetostrictive ring 24 serves to amplify and add the motion of both the magnetostrictive ring 24 and the piezoelectric stack 26. Force is reduced as amplitude is increased. Amplification of motion is necessary because of the relatively small changes in dimensions that can be achieved in both magnetostrictive rings and piezoelectric stacks as compared to that necessary to drive the radiating shells 14.

Because of its small size the magnetostrictive ring 24 has a resonance that is expected to be much higher than the radiator's 10 operating frequency which is influenced more by the resonant system consisting of the mass of the radiating shells 14, the radiation load, and the spring function of the aforementioned bow constituted by the magnetostrictive ring 24.

Two flexible ring-shaped diaphragms 74 bridge small gaps 76 between the median ring 68 and radiating shells 14. They permit relative axial motion between radiating shells 14 and isolate the median rings 68. They are fabricated from thin sheets of stainless steel or other fatigue resistant material. Alternatively, the diaphragms 74 may be corrugated concentrically to enhance their flexibility. The flexural gap 76 is wide enough to minimize the spring function and diaphragm bending stress but not so wide that the diaphragms 74 bow inward and outward objectionable distances to affect sound radiation negatively. Localized stiffness of gasket retainer rings 78 and 80 assist fasteners 82 and 84 in producing evenly distributed contact pressure at diaphragm seals.

The width of the median ring 68 is made sufficient to accommodate radial threaded holes 61-66, in which various through fittings and assemblies are positioned and sealed by gaskets 86. The median ring 68 is made sufficiently thick to achieve a radial stiffness equal to or greater than that of the medium. The outboard cross-section of the median ring 68 has a taper 88 to smooth the expanding nearfield acoustic path.

A sound-restricting, pressure-equalizing assembly 90 is installed in the top radial threaded hole 61 in the median ring 68. Circular assembly 90 parts, 94, 96, 98 and 100 plus fasteners 102 serve to position sound-restricting sintered metal filter 104 similar to that shown in U.S. Pat. No. 4,178,577 and sheet elastomeric diaphragm 106. Diaphragm 106 separates interior oil 108 from ambient water 110 which enters through vents 112. Neither filter 104 or diaphragm 106 can sustain a constant pressure differential. A pipe 114 with cap 116 is installed in bottom radial hole 64 and serves during oil filling and draining procedures. The radiator 10 can operate in any orientation.

The compressibility or "pressure release" function is provided by the air-filled elastomeric tube 18 routed in close proximity to the interior radiating shell walls 118 and around the driver 12. A compensating air supply source, not shown, supplies air at the pressure of the surrounding water to elastomer tube 18 via fittings 120 and 122 installed in respective threaded holes 63 and 65 in median ring 68. An elastomer spacer cord 124 wound around or molded into elastomer tube 18 serves to create spaces for cooling oil to reach applicable parts. Interior oil, which may be low modulus silicon oil transfers driver 12 and other heat to cool exterior metal walls and also functions as a very short acoustic link between oscillating surfaces and elastomer tube 18.

There has therefore been described a system that by initiating wavefronts that are rough approximations of a sphere, partially avoids the nearfield diffractive effects involved when grossly non-spherical wavefronts are converted into spherical wavefronts. These diffractive effects can add to the undesirable reactive load. For example, a flat radiating face initiates flat wavefronts that diffract laterally in the close nearfield as they transform into spherical wavefronts. The complete spherical wave emanating from a monopole radiator obviates the need for abutting elements as would be desirable with dipoles to lengthen the acoustic path between poles.

The conical sections of the radiating shells 14 are inherently stiff and light thus helping to minimize the oscillating mass which the driver 12 must drive. The closed truncated ends and peripheral flanges are in effect short cantilever beams which because their thickness is about the same as their length should not flex appreciably.

The driver 12 does not employ an airgap as do variable reluctance types so that no provision need be provided to maintain an accurate airgap. For example, during depth change this eliminates the problem of induced changes in pressure, driver heating induced changes in temperature, and shock forces.

All major portions of the driver 12 are active, i.e., participate in the generation of mechanical motion. The piezoelectric stack 26 occupies the space that might otherwise be occupied by a passive spreader, or vice versa, the magnetostrictive ring 24 occupies the space that might otherwise be occupied by passive bows. Since one is sensitive to magnetic fields, the other to electric potential fields they do not interfere when combined in a close compact package.

The junctions between the magnetostrictive ring 24 and the piezoelectric stack 26 and radiating shells 14 are as rigid as possible in the direction of transferral of oscillating linear motion and as flexible as possible as regards ring flexure. Corrugated surfaces pressure vent the liquid in these junctions that would otherwise cause a degree of stiffness in these joints.

The air-filled elastomer tube 18 provides an adequate compressibility or pressure release function at low frequencies with a minimum of compensating air. It also permits the interior of radiator 10 to be otherwise filled with electrically insulating but heat transferring oil 108. The spacer wrapped elastomer tube 18 will not lay directly against parts and thus impede the circulation of cooling oil.

All parts are relatively uncomplicated and therefore relatively easy to fabricate. By not incorporating too many functions in one part, it is possible in many cases by adjusting the parameters of a single part or pair of parts, independent of the parameters of other parts, to adjust a function during a development process or to optimize a design for a specific application. This feature also minimizes the problems involved in the replacement of parts which may wear out or suffer damage more readily than others.

It will understood that many additional changes in the details, materials, steps and arrangement of parts, which have herein been described and illustrated in order to explain the nature of the invention, may be made by those skilled in the art within the principal and scope of the invention as expressed in the appended claims.

What is claimed is:

1. A monopole underwater sound radiator comprising:
    two hollow, stiff-walled, frustum-shaped radiating shells positioned on a common axis having large diameter open ends facing each other;
    an intervenng median ring assembly comprising means for closing said frustum-shaped radiating shells and containing flexible diaphragms;
    an internal acoustic drive mechanism fastened to and located between the frustum-shaped radiating shells, said acoustic driver mechanism comprises an a uniform cross-sectioned elliptical ring shaped active first driver element and an active second driver element spanning the inside distance between and attached to the interior of said elliptical ring shaped active first driver element on the major axis of said first driver element, said first driver element having means for expanding said first driver and said second driver element having means for contracting said second driver and vice-versa upon receipt of the same electrical signal;
    an air-filled elastomer-walled tube routed within said radiator, said air-filled tube maintained at the same pressure as the surrounding medium; and
    oil filling said radiator.

2. A monopole underwater sound radiator according to claim 1 wherein each of the two said radiating shells are comprised of two distinct radiating areas, each of said shells having a truncated end and conical side, said conical side being contiguous to said truncated end.

3. A monopole underwater sound radiator comprising:
    two hollow, stiff-walled, frustum-shaped radiating shells positioned on a common axis having large diameter open ends facing each other wherein each of the two said radiating shells are comprised of two distinct radiating areas, each of said shells having a truncated end and conical side, said conical side being contiguous to said truncated end;
    an intervening median ring assembly comprising means for closing said frustum-shaped radiating shells and containing flexible diaphragms;
    an internal acoustic driver mechanism fastened to and located between the frustum-shaped radiating shells, said driver mechanism is comprised of a uniform cross-sectioned, elliptical magnetostrictive ring and piezoelectric spreader, said piezoelectric spreader spanning the inside distance between and attached to the interior of said elliptical magnetostrictive ring on the major axis of said ring, said eliptical magnetostrictive ring and said piezoelectric spreader connected electrically to the same alternating signal power source such that one is contracting in length while the other is expanding in length, and with output attachment points being along the minor axis of said elliptical magnetostrictive ring, the exterior surface of said elliptical magnetostrictive ring abutting said shells on the minor axis of said ring;

an air-filled elastomer-walled tube routed within said radiator, said air-filled tube maintained at the same pressure as the surrounding medium; and oil filling said radiator.

4. A monopole underwater sound radiator according to claim 3 wherein there are opposing compression contacts with the exterior convex ring surface and interior concave ring surface at each attachment point comprising in the case of the exterior convex ring surface of contact with a concave surface of slightly larger radius, and in the case of interior concave ring surfaces of contact with a convex surface of slightly smaller radius so that in each case gradual contacts are made along lines parallel to the elliptical axes.

5. A monopole underwater sound radiator according to claim 4 wherein half cylinder shaped adapters, interior radiating plate attachment surfaces, and associated washers have circumferentially corrugated curved faces abutting said magnetostrictive strictive ring to facilitate a dynamic pressure venting function at their parallel lines of contact with said magnetostrictive ring.

6. A monopole underwater sound radiator according to claim 5 further comprising a stress rod maintaining a compressive stress in said piezoelectric spreader, said stress rod being extended through apertures in said magnetostrictive ring and half-cylinder adapters for pressing said ring and said spreader in positive contact with each other.

7. A monopole underwater sound radiator according to claim 6 further comprising a sintered metal filter installation having filtering means for restricting the passage of sound energy but passing liquid slowly to equalize exterior and interior pressures and said installation further comprises an elastomer diaphragm having means for passing pressure and functioning as a separator between interior oil and exterior water.

8. A monopole underwater sound radiator according to claim 7 wherein said air-filled elastomeric walled tube is spirally wrapped in a suitable contour pattern with an elastomeric spacing cord to prevent said tube from impeding cooling oil circulation to radiator parts.

9. A monopole underwater sound radiator according to claim 8 wherein the wall thickness of the hollow, frustum-shaped radiating shells taper from a maximum at the truncated closed small diameter ends to a minimum near the periphery.

10. A monopole underwater sound radiator according to claim 8 wherein the outer cross-section of said median ring has fairing means in a papered configuration for avoiding adbrupt changes in the nearfield expanding propagation path.

11. An acoustic driver mechanism comprising:
an elliptical ring shaped active first driver element;
an active second driver element spanning the inside distance and attached to the interior of said elliptical ring shaped active first driver element on the major axis of said first driver element; and
said first driver element having means for expanding said first driver element and said second driver element having means for contracting said second driver element and vice-versa upon receipt of the same electrical signal.

12. An acoustic driver mechanism according to claim 11 wherein said first driver element comprises a magnetostrictive ring and said second driver element comprises a piezoelectric spreader.

* * * * *